US010560695B2

(12) United States Patent
Pettersson et al.

(10) Patent No.: US 10,560,695 B2
(45) Date of Patent: Feb. 11, 2020

(54) ENCODING AND DECODING OF PICTURES IN A VIDEO

(71) Applicant: Telefonaktiebolaget LM Ericsson (publ), Stockholm (SE)

(72) Inventors: Martin Pettersson, Vallentuna (SE); Kenneth Andersson, Gävle (SE); Simon Ekström, Upplands Väsy (SE); Jonatan Samuelsson, Enskede (SE); Jacob Ström, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 34 days.

(21) Appl. No.: 15/739,645

(22) PCT Filed: Jun. 23, 2016

(86) PCT No.: PCT/SE2016/050622
§ 371 (c)(1),
(2) Date: Dec. 22, 2017

(87) PCT Pub. No.: WO2016/209153
PCT Pub. Date: Dec. 29, 2016

(65) Prior Publication Data
US 2018/0332286 A1    Nov. 15, 2018

Related U.S. Application Data

(60) Provisional application No. 62/185,038, filed on Jun. 26, 2015.

(51) Int. Cl.
*H04N 19/124* (2014.01)
*H04N 19/14* (2014.01)
(Continued)

(52) U.S. Cl.
CPC ........... *H04N 19/124* (2014.11); *H04N 19/14* (2014.11); *H04N 19/18* (2014.11); *H04N 19/186* (2014.11);
(Continued)

(58) Field of Classification Search
CPC .... H04N 19/186; H04N 19/176; H04N 19/30; H04N 19/46; H04N 19/93; H04N 19/44; H04N 19/70; H04N 19/85; H04N 5/20
See application file for complete search history.

(56) References Cited

U.S. PATENT DOCUMENTS 5,768,534 A   6/1998  Guillotel et al.
7,369,284 B1* 5/2008  Inuzuka ................. H04N 9/045
                                                  348/E9.01
(Continued)

FOREIGN PATENT DOCUMENTS

WO   2005/013087 A2   2/2005
WO   2010/069366 A1   6/2010
(Continued)

OTHER PUBLICATIONS

International Search Report and Written Opinion issued in International Application No. PCT/SE2016/050622, dated Oct. 27, 2016, 14 pages.
(Continued)

*Primary Examiner* — Dave Czekaj
*Assistant Examiner* — Kehinde Abimbola
(74) *Attorney, Agent, or Firm* — Rothwell, Figg, Ernst & Manbeck, P.C.

(57) ABSTRACT

There are provided mechanisms for encoding a picture of a video sequence in a video bitstream. The picture comprises pixels wherein each pixel has a color value comprising at least one color component value. The method comprises determining a frequency distribution of the color component
(Continued)

values of the at least one color component. The method comprises determining at least one quantization parameter for coding of transform coefficients for the at least one color component based on the determined frequency distribution of the color component values. The method comprises encoding the determined at least one quantization parameter.

18 Claims, 11 Drawing Sheets

(51) Int. Cl.
    *H04N 19/18*     (2014.01)
    *H04N 19/186*     (2014.01)
    *H04N 19/36*     (2014.01)
    *H04N 19/60*     (2014.01)
    *H04N 19/176*     (2014.01)

(52) U.S. Cl.
    CPC ............ *H04N 19/36* (2014.11); *H04N 19/60* (2014.11); *H04N 19/176* (2014.11)

(56) References Cited

U.S. PATENT DOCUMENTS

| | | | |
|---|---|---|---|
| 8,749,579 B2* | 6/2014 | Zhu | G06T 11/001 345/589 |
| 8,982,963 B2* | 3/2015 | Gish | G06T 5/50 345/590 |
| 9,076,367 B2* | 7/2015 | Chu | G09G 5/02 |
| 2004/0071351 A1* | 4/2004 | Rade | G06T 9/005 382/232 |
| 2006/0067561 A1 | 3/2006 | Matsubara | |
| 2011/0002553 A1* | 1/2011 | Nishikawa | H04N 19/50 382/233 |
| 2011/0194618 A1* | 8/2011 | Gish | G06T 5/50 375/240.25 |
| 2012/0019548 A1* | 1/2012 | Zhu | G06T 11/001 345/589 |
| 2013/0028515 A1 | 1/2013 | Fukuhara et al. | |
| 2013/0259120 A1 | 10/2013 | Van Der Auwera et al. | |
| 2014/0071149 A1* | 3/2014 | Chu | G09G 5/02 345/589 |
| 2016/0366422 A1* | 12/2016 | Yin | H04N 19/117 |

FOREIGN PATENT DOCUMENTS

| | | |
|---|---|---|
| WO | 2014205363 A1 | 12/2014 |
| WO | 2015011752 A1 | 1/2015 |

OTHER PUBLICATIONS

Kunkel, T. et al., "HDR and Wide Gamut Appearance-based Color Encoding and its Quantification", 2013 Picture Coding Symposium (PCS), IEEE, Dec. 8, 2013, 4 pages.

Babu, R., et al., "A survey on compressed domain video analysis techniques", Multimedia Tools and Applications, Nov. 18, 2014, Kluwer Academic Publishers, Boston, US, ISSN, 36 pages.

Supplementary European Search Report issued in European Patent Application No. 16814814.6 dated Jul. 24, 2018, 10 pages.

* cited by examiner

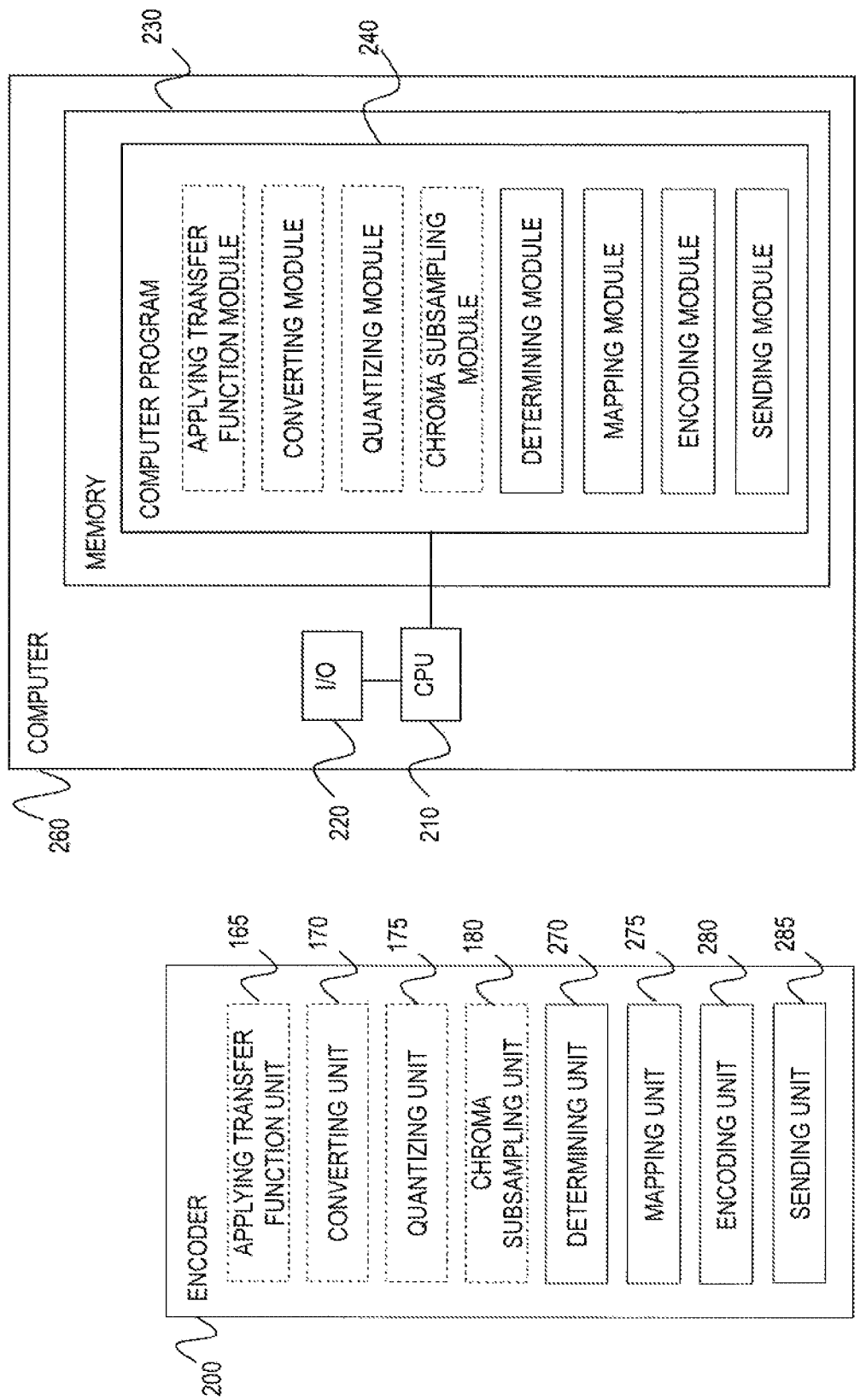

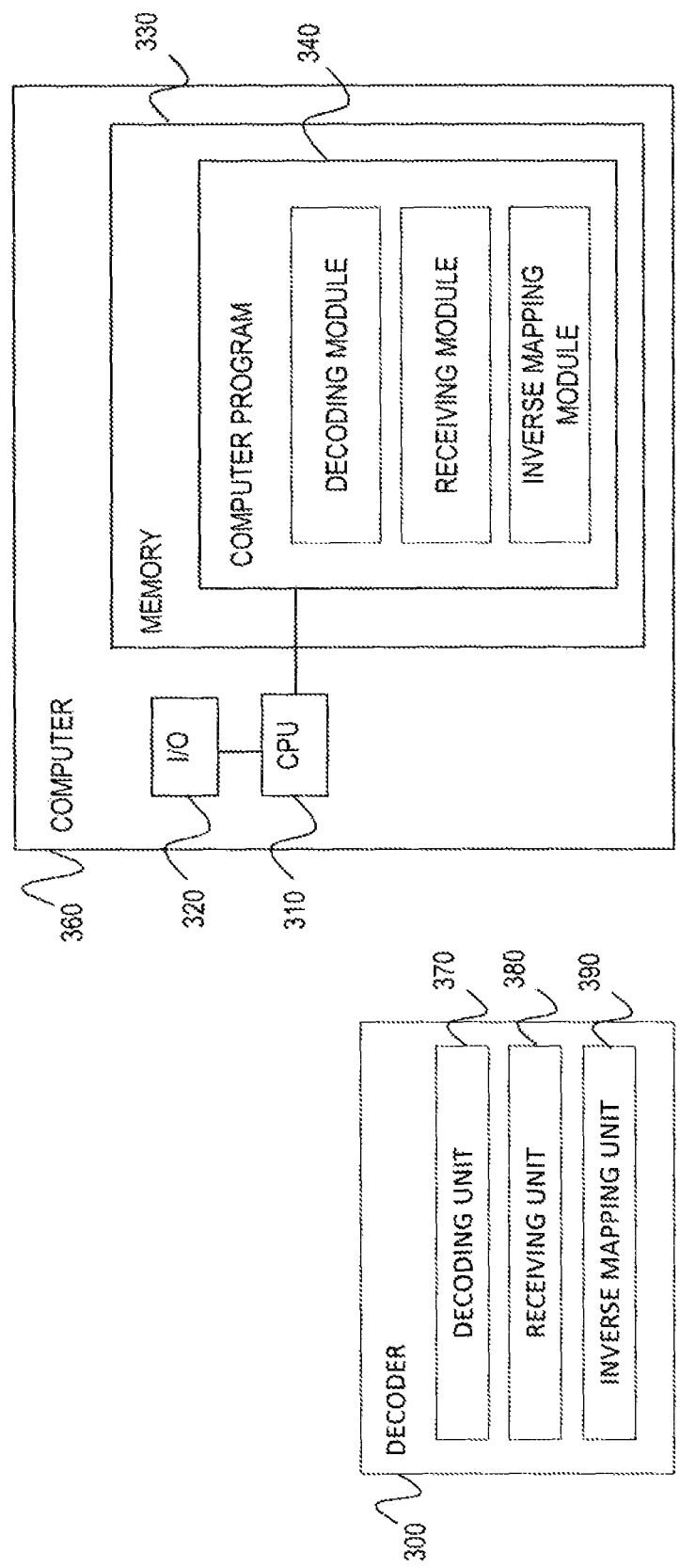

ENCODING AND DECODING OF PICTURES IN A VIDEO

CROSS REFERENCE TO RELATED APPLICATION(S)

This application is a 35 U.S.C. § 371 National Stage of International Patent Application No. PCT/SE2016/050622, filed Jun. 23, 2016, designating the United States and claiming priority to U.S. provisional application No. 62/185,038, filed on Jun. 26, 2015. The above identified applications are incorporated by reference.

TECHNICAL FIELD

Embodiments herein relate to the field of video coding, such as High Efficiency Video Coding (HEVC) or the like. In particular, embodiments herein relate to a method and an encoder for encoding a picture of a video sequence in a video bitstream, the picture comprising pixels wherein each pixel has at least one color value associated with at least one color component. Embodiments herein relate as well to a method and a decoder for decoding a picture of a video bitstream comprising an encoded video sequence, wherein a pixel value is represented by at least one code word. Corresponding computer programs therefor are also disclosed.

BACKGROUND

High Dynamic Range (HDR) has become an increasingly hot topic within the TV and multimedia industry in the last couple of years. While screens capable of displaying the HDR video signal are emerging at the consumer market, over-the-top (OTT) players such as Netflix have announced that HDR content will be delivered to the end-user. Standardization bodies are working on specifying the requirements for HDR. For instance, in the roadmap for DVB, UHDTV1 phase 2 will include HDR support. MPEG is currently working on exploring how HDR video could be compressed.

HDR imaging is a set of techniques within photography that allows for a greater dynamic range of luminosity compared to standard digital imaging. Dynamic range in digital cameras is typically measured in f-stops, where one f-stop means doubling of the amount of light. A standard LCD HDTV using Standard Dynamic Range (SDR) can display less than or equal to 10 stops. HDR is defined by MPEG to have a dynamic range of over 16 f-stops.

HDR is defined for UHDTV in ITU-R Recommendation BT.2020 while SDR is defined for HDTV in ITU-R Recommendation BT.709.

A color model is a mathematical model that defines the possible colors that can be presented using a predefined number of components. Examples of color models are RGB and CMYK. Adding a specific mapping function between the color model and a reference color space creates within the reference color space a "foot print" referred to as color gamut. Normally the CIELAB or XYZLAB color spaces are used as reference color spaces as they span the range of visible colors for the human visual system.

A picture element (pixel for short) is the smallest element of a digital image and holds the luminance and color information of that element.

The luminance and color can be expressed in different ways depending on the use case. Displays usually have three color elements, red, green and blue which are lit at different intensities depending on what color and luminance is to be displayed. It becomes therefore convenient to send the pixel information in RGB pixel format to the display. Since the signal is digital the intensity of each component of the pixel must be represented with a fixed number of bits, referred to as the bit depth of the component. For instance, an RGB pixel format with 8 bits per color component can be written RGB888. A bit depth of n can represent 2n different values, e.g. 256 values per component for 8 bits and 1024 values per component for 10 bits.

When video needs to be compressed it is convenient to express the luminance and color information of the pixel with one luminance component and two color components. This is done since the human visual system (HVS) is more sensitive to luminance than to color, meaning that luminance can be represented with higher accuracy than color. This pixel format is often referred to Y'UV where Y' stands for luminance and U and V stands for the two color components. The conversion between RGB and Y'UV for HDTV is to be made using the following matrix multiplications defined in BT.709:

$$\begin{bmatrix} Y' \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

$$\begin{bmatrix} R \\ G \\ B \end{bmatrix} = \begin{bmatrix} 1 & 0 & 1.28033 \\ 1 & -0.21482 & -0.38059 \\ 1 & 2.12798 & 0 \end{bmatrix} \begin{bmatrix} Y' \\ U \\ V \end{bmatrix}$$

Fourcc.org holds a list of defined YUV and RGB formats. The most commonly used pixel format for standardized video codecs (e.g. H.264/AVC, MPEG-4, HEVC) is YUV420 (aka YV12) planar where the U and V color components are subsampled in both vertical and horizontal direction and the Y, U and V components are stored in separate chunks for each frame. Thus for a bit depth of 8 per component, the number of bits per pixel is 12 where 8 bits represents the luminance and 4 bits the two color components.

Video is captured by cameras in the linear domain, meaning that the color values are linearly proportional to the amount of light in candela per square meter (cd/m2). Before encoding the video, the video is typically transferred to a perceptual domain using a transfer function (TF) to minimize the visible errors of the encoding. After decoding, the video is typically converted back to the linear domain using the inverse transfer function. Three transfer functions that have been discussed for HDR in MPEG is the Dolby PQ-EOTF (aka PQTF), the Philips TF and the BBC TF.

HEVC version 2 includes a Color Remapping Information (CRI) Supplemental Enhancement Information (SEI) message which may be used to remap the color components of the decoded samples to a different color space. The intent of this message is to adapt to legacy displays (e.g. converting from ct.2020 using wide color gamut (WCG) to legacy ct.709) while preserving artistic intent of the color gradings from studios and to ensure rendered color fidelity for the end user. Output Code Map (OCM) SEI message provides improvement as compared to the CRI SEI message in a sense that more than 33 pivot values are possible, making it possible to convert from 10 to 12 bits without the need to interpolate the values between the pivots.

High Efficiency Video Coding (HEVC) is a block based video codec standardized by ITU-T and MPEG that utilizes both temporal and spatial prediction. Spatial prediction is achieved using intra (I) prediction within the current frame. Temporal prediction is achieved using inter (P) or bi-directional inter (B) prediction on block level from previously decoded reference pictures. The difference between the original pixel data and the predicted pixel data, referred to as the residual, is transformed into the frequency domain and quantized before transmitted together with necessary prediction parameters such as mode selections and motion vectors. By quantizing the transformed residuals, the tradeoff between bitrate and quality of the video may be controlled.

The level of quantization is determined by the quantization parameter (QP). The quantization parameter (QP) is a key technique to control the quality/bitrate of the residual in video coding. It is applied such that it controls the fidelity of the residual (typically transform coefficients) and thus also controls the amount of coding artifacts. When QP is high the transform coefficients are quantized coarsely resulting in fewer bits but also possibly more coding artifacts than when QP is small where the transform coefficients are quantized finely. A low QP thus generally results in high quality and a high QP results in low quality. In HEVC v1 (similarly also for H.264/AVC) the quantization parameter can be controlled on picture or slice level or block level. On picture and slice level it can be controlled individually for each color component. In HEVC v2 the quantization parameter for chroma can be individually controlled for the chroma components on a block level.

SUMMARY

The range of the available values of the color components used for the encoding could be referred to as the available code words of the color components. For instance, if a color component is quantized to 8 bits, there will be $2^8=256$ available code words.

The code words of the color components are in general not very well utilized. For a given picture, many of the code words will typically not be used at all and some will just be used very seldom. This is a waste, since too many bits are then used to represent the color values that are actually not used. As a consequence, the video quality or, equivalently, the coding efficiency is reduced.

Thus, to increase the video quality or, equivalently, the coding efficiency, it is of utter importance to better utilize the available code words.

This and other objectives are met by embodiments as disclosed herein.

A first aspect of the embodiments defines a method for encoding a picture of a video sequence in a video bitstream. The picture comprises pixels wherein each pixel has a color value comprising at least one color component value. The method comprises determining a frequency distribution of the color component values of the at least one color component. The method comprises determining at least one quantization parameter for coding of transform coefficients for the at least one color component based on the determined frequency distribution of the color component values. The method comprises encoding the determined at least one quantization parameter.

A second aspect of the embodiments defines an encoder for encoding a picture of a video sequence in a video bitstream. The picture comprises pixels wherein each pixel has a color value comprising at least one color component value. The encoder comprises processing means operative to determine a frequency distribution of the color component values of the at least one color component. The encoder comprises processing means operative to determine at least one quantization parameter for coding of transform coefficients for the at least one color component based on the determined frequency distribution of the color component values. The encoder comprises processing means operative to encode the determined at least one quantization parameter.

A third aspect of the embodiments defines a computer program for encoding a picture of a video sequence in a video bitstream. The picture comprises pixels wherein each pixel has a color value comprising at least one color component value. The computer program comprises code means which, when run on a computer, causes the computer to determine a frequency distribution of the color component values of the at least one color component. The computer program comprises code means which, when run on a computer, causes the computer to determine at least one quantization parameter for coding of transform coefficients for the at least one color component based on the determined frequency distribution of the color component values. The computer program comprises code means which, when run on a computer, causes the computer to encode the determined at least one quantization parameter.

A fourth aspect of the embodiments defines a computer program product comprising computer readable means and a computer program, according to the third aspect, stored on the computer readable means.

A fifth aspect of the embodiments defines a method for encoding a picture of a video sequence in a video bitstream. The picture comprises pixels wherein each pixel has a color value comprising at least one color component value. The method comprises determining a frequency distribution of the color component values of the at least one color component. The method comprises mapping the color values of the at least one color component to code words, based on the determined frequency distribution of the color values of the at least one color component. The method comprises encoding the picture having the color component values of the at least one color component replaced with the code words. The method comprises sending information to a decoder or a post-processor on how to do an inverse mapping from the code words to the color component values for the at least one color component.

A sixth aspect of the embodiments defines an encoder for encoding a picture of a video sequence in a video bitstream. The picture comprises pixels wherein each pixel has a color value comprising at least one color component value. The encoder comprises processing means operative to determine a frequency distribution of the color component values of the at least one color component. The encoder comprises processing means operative to map the color values of the at least one color component to code words, based on the determined frequency distribution of the color values of the at least one color component. The encoder comprises processing means operative to encode the picture having the color component values of the at least one color component replaced with the code words. The encoder comprises processing means operative to send information to a decoder or a post-processor on how to do an inverse mapping from the code words to the color component values for the at least one color component.

A seventh aspect of the embodiments defines a computer program for encoding a picture of a video sequence in a video bitstream. The picture comprises pixels wherein each pixel has a color value comprising at least one color component value. The computer program comprises code means which, when run on a computer, causes the computer to determine a frequency distribution of the color component values of the at least one color component. The computer program comprises code means which, when run on a computer, causes the computer to map the color values of the at least one color component to code words, based on the determined frequency distribution of the color values of the at least one color component. The computer program comprises code means which, when run on a computer, causes the computer to encode the picture having the color component values of the at least one color component replaced with the code words. The computer program comprises code means which, when run on a computer, causes the computer to send information to a decoder or a post-processor on how to do an inverse mapping from the code words to the color component values for the at least one color component An eighth aspect of the embodiments defines a computer program product comprising computer readable means and a computer program, according to the seventh aspect, stored on the computer readable means.

A ninth aspect of the embodiments defines a method for decoding a picture of a video bitstream comprising an encoded video sequence. The picture comprises pixels having pixel values, wherein a pixel value is represented by at least one code word. The method comprises decoding the picture. The method comprises receiving information on how to do the inverse mapping from the at least one code word to color component values of the at least one color component. The method comprises inverse mapping the at least one code word to the color component values of the at least one color component.

A tenth aspect of the embodiments defines a decoder for decoding a picture of a video bitstream comprising an encoded video sequence. The picture comprises pixels having pixel values, wherein a pixel value is represented by at least one code word. The decoder comprises processing means operative to decode the picture. The decoder comprises processing means operative to receive information on how to do the inverse mapping from the at least one code word to color component values of the at least one color component. The decoder comprises processing means operative to inverse map the at least one code word to the color component values of the at least one color component.

An eleventh aspect of the embodiments defines a computer program for decoding a picture of a video bitstream comprising an encoded video sequence. The picture comprises pixels having pixel values, wherein a pixel value is represented by at least one code word. The computer program comprises code means which, when run on a computer, causes the computer to decode the picture. The computer program comprises code means which, when run on a computer, causes the computer to receive information on how to do the inverse mapping from the at least one code word to color component values of the at least one color component. The computer program comprises code means which, when run on a computer, causes the computer to inverse map the at least one code word to the color component values of the at least one color component.

A twelfth aspect of the embodiments defines a computer program product comprising computer readable means and a computer program, according to the eleventh aspect, stored on the computer readable means.

Advantageously, at least some of the embodiments provide higher compression efficiency.

It is to be noted that any feature of the first, second, third, fourth, fifth, sixth, seventh, eighth, ninth, tenth, eleventh and twelfth aspects may be applied to any other aspect, whenever appropriate. Likewise, any advantage of the first aspect may equally apply to the second, third, fourth, fifth, sixth, seventh, eighth, ninth, tenth, eleventh and twelfth aspects respectively, and vice versa. Other objectives, features and advantages of the enclosed embodiments will be apparent from the following detailed disclosure, from the attached dependent claims and from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise.

The steps of any method disclosed herein do not have to be performed in the exact order disclosed, unless explicitly stated.

BRIEF DESCRIPTION OF THE DRAWINGS

The invention, together with further objects and advantages thereof, may best be understood by making reference to the following description taken together with the accompanying drawings, in which:

FIGS. 10 and 12 depict a schematic block diagram illustrating functional units of an encoder for encoding a picture of a video sequence according to embodiments of the present invention.

FIGS. 11 and 13 illustrate schematic block diagrams illustrating a computer comprising a computer program product with a computer program for encoding a picture of a video sequence, according to embodiments of the present invention.

FIG. 14 depicts a schematic block diagram illustrating functional units of a decoder for decoding a picture of a video bitstream comprising an encoded video sequence according to an embodiment of the present invention.

FIG. 15 illustrates a schematic block diagram illustrating a computer comprising a computer program product with a computer program for decoding a picture of a video bitstream comprising an encoded video sequence, according to an embodiment of the present invention.

DETAILED DESCRIPTION

The accompanying drawings, which are incorporated herein and form part of the specification, illustrate various embodiments of the present invention and, together with the description, further serve to explain the principles of the invention and to enable a person skilled in the art to make and use the invention. Throughout the drawings, the same reference numbers are used for similar or corresponding elements.

Throughout the description, the terms "video", "video sequence", "input video" and "source video", "bin" and "interval", as well as "determined QP" and "recommended QP" are interchangeably used.

Even though the description of the invention is based on the HEVC codec, it is to be understood by a person skilled in the art that the invention could be applied to any other state-of-the-art and a future video coding standard.

The present embodiments generally relate to a method and an encoder for encoding a picture of a video sequence in a bitstream, as well as a method and a decoder for decoding a picture of a video bitstream comprising an encoded video sequence.

The present invention is on using the available code words more efficiently, by looking at the frequency distribution of the color component values of the at least one color component.

Figure 1:
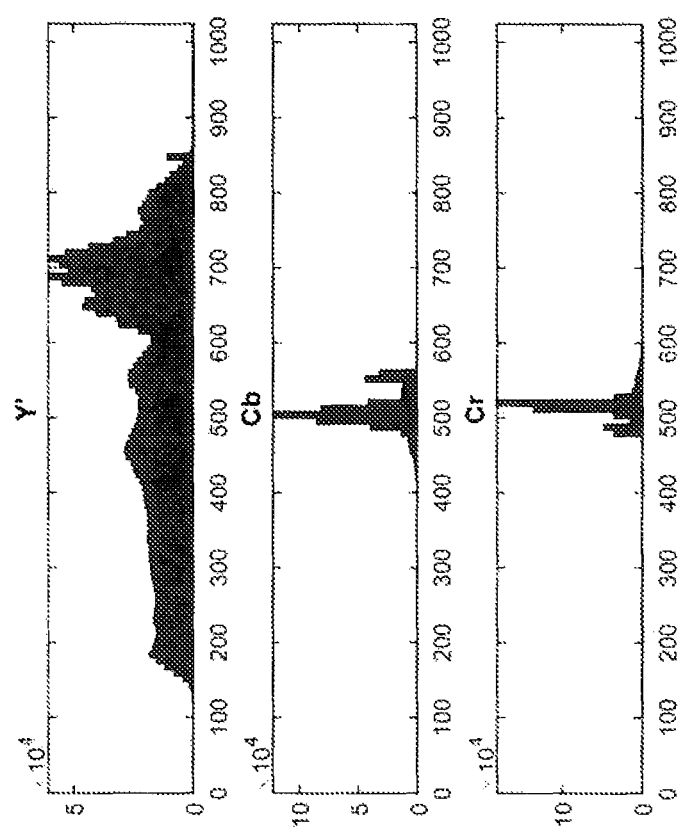
FIG. 1 shows a histogram of the color component values going through a typical preprocessing chain for HDR video with the PQ transfer function, quantization and chroma subsampling applied, according to prior art.

FIG. 1 shows a histogram of the color component values going through a typical preprocessing chain for HDR video with the Perceptual Quantizer (PQ) transfer function, quantization and chroma subsampling applied. Although PQ transfer function (PQTF) performs well in optimizing the usage of the bits based on how the human eyes perceive colors, there still remains a lot of unused code words, especially for the color components.

Figure 2:
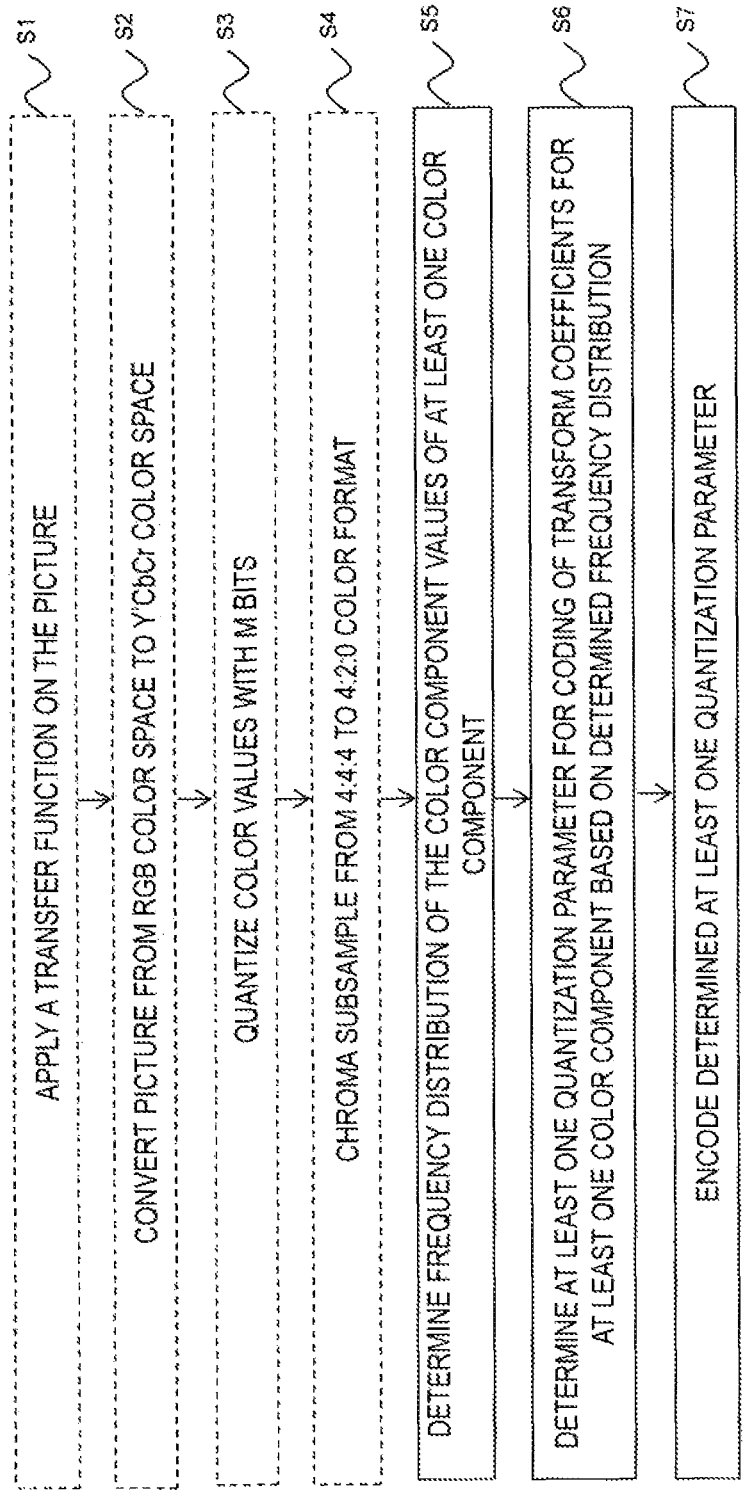
FIGS. 2-3 illustrate flowcharts of a method of encoding a picture of a video sequence, according to embodiments of the present invention.

According to one aspect, a method for encoding a picture of a video sequence in a video bitstream is provided, as shown in FIG. 2. The picture comprises pixels, wherein each pixel has a color value comprising at least one color component value.

The method comprises a step S5 of determining a frequency distribution of the color component values of at least one color component. A color component value could refer to a sample value in one of the color components of the color format, e.g. Y'CbCr or RGB, or a value representing another property of the pixels, e.g. a depth value, a transparency value or the like. Further on, a frequency distribution of the color component values of only one or two of the Y', Cb or Cr component may be determined, or a frequency distribution of the color component values for all of the Y', Cb and Cr components may be determined.

A frequency distribution may, for example, be determined from a histogram, similar to what is shown in FIG. 1. However, a person skilled in the art would understand that this would not necessary always imply a strictly defined histogram in the mathematical sense, but would rather mean that the determining is to some extent based on the frequency of the color component values of the source video.

The method further comprises a step S6 of determining at least one quantization parameter (QP) for coding of transform coefficients for the at least one color component based on the determined frequency distribution of the color component values. This way, the quantization (or equivalently quantization parameter) of transform coefficients for a color component, is controlled by the frequency distribution of color component values for that color component. Each QP corresponds to a certain fidelity of change of predicted pixel values. When the QP is large, only changes in large steps of pixel values are possible, whereas small QPs imply small step sizes.

Having the QP being dependent on the frequency distribution of color component values means that the determined (recommended) QP may be different than a QP that would be assigned to the transform coefficients given e.g. a bitrate or fidelity constraint. The latter QP is referred to as a reference QP to reflect that the reference QP is obtained in a way it is done in state of the art, as for example in HEVC. The determined QP may be smaller, equal or even larger than the reference QP. The determined QP may thus change locally in a picture due to the frequency distribution of the color component values. For example, the QP can be smaller (finer quantization step size) for regions of common color component values compared to the QP for regions with less common color component values (coarser quantization step size). This has the effect that the regions with common color component values can be encoded with better similarity to the source color values than for regions of less common color component values and that an encoding of an area with common color values in a future picture can benefit by use of inter prediction. In a block based encoder, the determined QP can change on block level due to the frequency distribution of the color component values. The size of the block where the QP can change relates typically to the size of the transform block so that it is of same size as the transform block or of a larger size than the transform block.

Other indications that a smaller QP than a reference QP should be used for some color component values of a color component are if a significantly better mapping of the reconstructed color value to the original color value can be achieved by mapping with exact matching, where the residual is quantized finely using a small QP to be able to reconstruct a color component value that matches exactly the original color value. The reason for doing this may be to keep a higher accuracy of certain color component values for other reasons than the one that the color values are common.

It may even be possible to define a lookup table, qpStepTable, where one could look for recommended QP values. For example, based on a frequency distribution of the color component values of a color component, one can get an estimate of the required (recommended) step size for that color component. Then, from a table lookup from qpStepTable, one can get a recommended (determined) QP to use for that color component. The recommended QP will thus change locally in the picture based on the frequency distribution of the color component values. For example, the recommended QP may be smaller (finer quantization step size) for regions of common color component values compared to the recommended QP for regions with less common color component values (coarser quantization step size). This has the effect that regions with common color component values can encoded with better similarity to the source color component values than for regions of less common color component values and that an encoding of an area with common color values in a future picture can benefit by use of inter prediction. The encoder can then use this QP as is or make a smaller change of the QP towards the reference QP. Therefore, for each reference QP that encoding is planned for, it may be advantageous to consider if significant improvements can be made by using a smaller QP than the reference QP or if its sufficient to use a larger QP for a specific color component. Depending on bitrate constraints it may not always be desired to adjust according to the determined QP.

The method further comprises a step S7 of encoding the determined at least one quantization parameter. The determined at least one quantization parameter may be encoded with HEVC or any other existing or future video encoding standard. Typically, what is encoded is a difference between a desired quantization parameter and a prediction of the quantization parameter. One example of prediction used in HEVC is to predict the quantization parameter from a neighboring blocks quantization parameters.

The encoder may use a predefined bitdepth for encoding the pictures. However, a bitdepth lower than the predefined bitdepth could be used during encoding for pictures that do not utilize a wide enough range of the available colors in the color space. For instance, instead of encoding with a bitdepth of 10 bits (equivalently, 10 bits per pixel (bpp)) where only half of the available code words are utilized, i.e. $10^2/2=512$ code words, only 9 bits per pixel could be is used and the $9^2=512$ code words would be mapped to color component values that are used in the source video.

Figure 3:
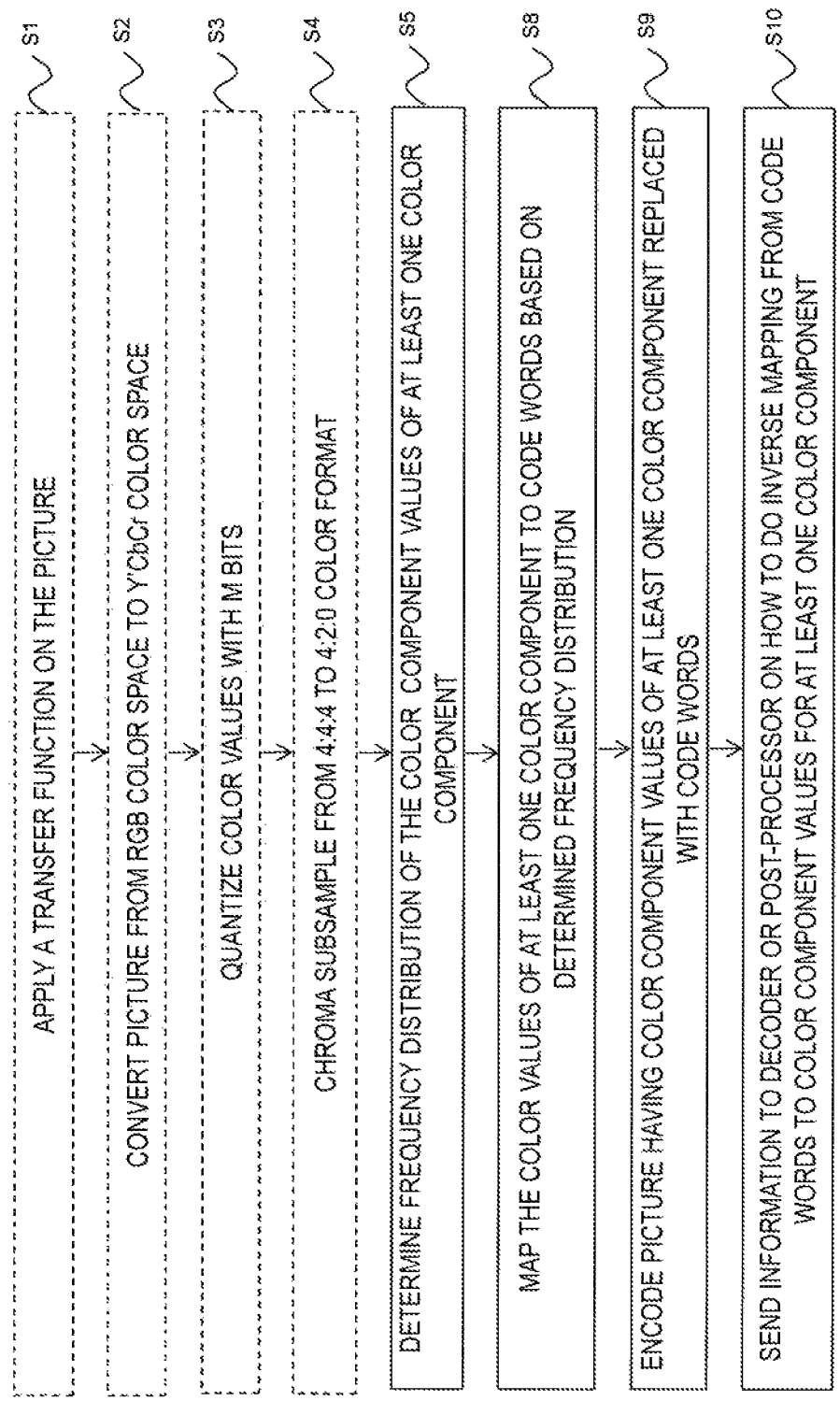

According to another aspect, a method for encoding a picture of a video sequence in a video bitstream is provided, as shown in FIG. 3. The picture comprises pixels, wherein each pixel has a color value comprising at least one color component value.

The method comprises a step S5 of determining a frequency distribution of the color component values of at least one color component. This step is already described above.

The method further comprises a step of mapping S8 the color values of the at least one color component to code words, based on the determined frequency distribution of the color component values. This may be done by using a so-called mapping curve. Similarly, color value mapping (CVM) may be used to refer to a process that consists of a generation of the mapping curve and the mapping of the color component values to code words.

Each of the color components may have its own mapping curve. For example, a different mapping curve may be generated for each one of the Y', Cb, and Cr color components based on the frequency distribution of the corresponding color component values.

According to one embodiment, the mapping curve uses a number of bins (intervals) of a fixed size so that all the color values that fall within the same bin are mapped to the same value. The size of the bins may be predefined to be equal to intervalSize. The number of intervals to which the color values are mapped to is then determined by a bit depth of the pixels before the mapping (also called the input bit depth) and the interval size. For example, in the case of an input bit depth of 16 bits and an interval size of 1024 the resulting number of intervals would be $$\frac{2^{16}}{1024} = 64.$$

The mapping S8 is done by going through every bin (interval). Every bin may be assigned a slope based on the ratio between the values in the current bin (interval) and the total number of values. This provides intervals with a higher number of values a higher slope, resulting in higher precision for the color intervals that are used the most.

A predefined base slope value, C, may also be added for every bin (interval), in order to ensure that every bin (interval) maps to a value if the ratio between the values in the bin (interval) and the total number of values is equal to zero. This could be important when applying lossy encoding.

When the mapping curve is constructed, its Y-axis, corresponding to the values after the mapping, may be normalized. The range of normalized values depends on the properties of the coding chain. One prominent example is to map to 10 bits, i.e., 1024 values. However, other output ranges could be envisaged, for instance an 8 bit range (256 levels) if the 8 bit coding chain is used.

Below is an example of a pseudo code describing the algorithm for generating the mapping curves:

```
intervalCount = (1 << inputBitDepth) / intervalSize
FOR each component
    BuildHistogram( )
    totalSum = [Total number of values]
    lastY = 0
    FOR i in range(0, intervalCount)
        x1 = i * intervalSize
        x2 = (i+1) * intervalSize
        subSum = sum of values in range(x1, x2)
        ratio = subSum / totalSum
        y1 = lastY
        y2 = lastY + ratio + C
        interval = {x1, y1, x2, y2}
        intervals[component].push_back(interval)
    END FOR
    // Normalize Y to range(0, 1 << outputBitDepth)
    NormalizeIntervals( )
END FOR
```

Other ways of determining the slope of the bin (interval) are also possible. For example, the average sum of the n adjacent bins (intervals) may be used, as shown in the source code below. This would smoothen out the curve and allow for a smaller value for the base slope.

```
begin = (i−n) * intervalSize
end = (i+1+n) * intervalSize
subSum = sum of values in range(begin, end) / (2*n+1)
ratio = subSum / totalSum
```

The mapping curve may be generated for every picture. However, it may not and it usually is not necessary to update the mapping curve so often. The curve may instead be updated for every GOP or every scene. It may also be generated more often, for instance for every slice or every block.

When updating the mapping curve less frequently than every picture, e.g. only every GOP, the curve may be generated based on color component values only in the current picture or it may be generated based on color component values from two or more pictures of the GOP. Yet another option would be to generate the mapping curve for every picture, but only update it when it is sufficiently different from the previously updated mapping curve.

Figure 4:
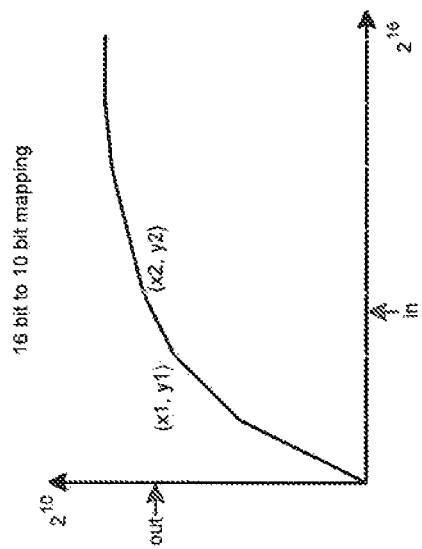
FIG. 4 shows the process of mapping a 16 bit value, in, to a 10 bit value, out, using a generated mapping curve, according to embodiments of the present invention.

FIG. 4 shows the process of mapping a 16 bit value, in, to a 10 bit value, out, using a generated mapping curve. Firstly, the interval containing the value to map needs to be located. When the interval is located, the out value is computed by using interpolation between the two points that defines the interval. Here the type of interpolation method to use could be decided by whoever implements the technology. It would also be possible to extend it further allowing a number of various interpolation methods.

The pseudo code below shows the process of doing the mapping on the input picture.

```
FOR each component
    FOR i in range (0, number of values)
        x = input[component][i]
        // Find the interval containing the value we want to map
        int = intervals[component].find(pixel[component])
        // Linear interpolation
        y = int.y1 + (int.y2 − int.y1) * (x − int.x1) / (int.x2 − int.x1)
        output[component][i] = y
    END FOR
```

The mapping curve has two main parameters controlling how the curve is shaped: the bin (interval) size and the base slope for the bins (intervals). A large bin (interval) size will result in a more linear curve and it would not be as beneficial in cases where there are very large but narrow spikes in the input data. A smaller interval size will be able to provide some precision when it comes to the mapping. However, a small interval size will require more metadata to be shared between the encoder and the decoder.

A base slope may be added to all intervals to be able to represent color value variations inside the interval with corresponding variation of code words. Having the curve completely flat, e.g. base slope is 0, for regions not containing any values before compression would be beneficial in terms of code word utilization, but the encoder would not be able represent any variation in code words that end up in that interval after compression to efficiently code flat regions which could cause step like artifacts.

According to another embodiment, the mapping curve uses bins of variable sizes that depends on the frequency distribution of the color component values of the pixels. Wider bins are used for color component values that are seldom used and more narrow bins are used for color component values that are used more frequently. For each bin, the bin size is defined and also the value that the code word (bin ID) is mapped (converted) back to in the inverse mapping process.

In one version of the embodiment, a number of N most frequent color component values of the source video is given an exact mapping when inverse mapping (converting back) is performed after decoding. In a very simplified example, a color component has the bit depth 8 (256 possible color component values) in the source video and bit depth 3 is used in the encoded video giving $2^3=8$ different code words. Assume that the distribution of the color component values corresponding to one color component is the following:

TABLE 1

Simplified example of color component value frequency distribution of a picture.

| | Color component value | | | | | | | | | | | | |
|---|---|---|---|---|---|---|---|---|---|---|---|---|---|
| | 5 | 13 | 14 | 18 | 60 | 61 | 62 | 108 | 128 | 156 | 179 | 208 | 239 |
| Frequency | 456 | 158 | 127 | 56 | 321 | 529 | 432 | 123 | 79 | 22 | 14 | 2 | 3 |
| Frequency order | 2 | 5 | 6 | 10 | 4 | 1 | 3 | 7 | 9 | 8 | 11 | 13 | 12 |

The mapping of a static transfer function (i.e. transfer function that does not change over time, such as the PQTF or the gamma function) with a perceptual weighting for 3-bit code words is shown in Table 1. The color component values are mapped to code words (bin IDs) and then back to 8-bit values after decoding.

TABLE 2

Mapping table based on a static perceptual transfer function.

| Bin ID | 0 | 1 | 2 | 3 | 4 | 5 | 6 | 7 |
|---|---|---|---|---|---|---|---|---|
| Bin range | [0, 16] | [17, 39] | [40, 61] | [62, 94] | [95, 126] | [127, 163] | [164, 204] | [205, 255] |
| Maps to | 8 | 28 | 50 | 78 | 110 | 145 | 184 | 230 |

By using the mapping table in Table 2, the sum of squared errors (SSE) could be calculated (not counting compression errors caused by the encoding) as:

$$SSE=456*(5-8)^2+158*(13-8)^2+127*(14-8)^2+56* \\ (18-28)^2+321*(60-50)^2+529*(61-50)^2+432* \\ (62-78)^2+123*(108-110)^2+79*(128-145)^2+22* \\ (156-145)^2+14*(179-184)^2+2*(208-230)^2+3* \\ (239-230)^2=252\ 473$$

It is also worth noting that three of the four most frequent color component values, 60, 61 and 62, which may be present in a gradient of the picture, are mapped to the values 50 and 78, which are quite far from their original values.

If, instead, the 5 most frequent color component values are given an exact match, the mapping table could for this picture look something like this:

TABLE 3

Mapping table where the 5 most frequent values are given an exact match with the source value in the mapping after decoding.

| Bin ID | 0 | 1 | 2 | 3 | 4 | 5 | 6 | 7 |
|---|---|---|---|---|---|---|---|---|
| Bin range | [0, 9] | [10, 36] | [37, 60] | [61] | [62, 75] | [76, 142] | [143, 203] | [204, 255] |
| Maps to | 5 | 13 | 60 | 61 | 62 | 116 | 179 | 227 |

By using the mapping table in Table 3, the sum of squared errors (SSE) could be calculated (not counting compression errors) as:

$$SSE=456*(5-5)^2+158*(13-13)^2+127*(14-13)^2+56* \\ (18-13)^2+321*(60-60)^2+529*(61-61)^2+432* \\ (62-62)^2+123*(108-116)^2+79*(128-116)^2+22* \\ (156-179)^2+14*(179-179)^2+2*(208-227)^2+3* \\ (239-227)^2=33\ 567$$

In an alternative approach, the sizes of the bins and the value to map to after decoding are set in a way that minimizes the total error in a picture. Similar as in the previous embodiment, the mapping table may be regenerated and updated for every block, every slice, every picture, every GOP or every scene.

In yet another approach, the number of intervals (bins) is determined based on the distortion between the 16 bit source samples and the samples processed by the method steps performed by the encoder and the inverse method steps performed by the decoder. The number of bins with least distortion compared to the number of bits required to encode the mapping curve is selected. Optionally this optimization process could also contain addition of noise to the samples before inverse mapping to simulate video coding noise. The amplitude of the noise can be controlled by the intended QP for the encoding.

In yet another embodiment, the inverse mapping is used inside the coding loop to determine the actual distortion rather than the distortion in the CVM sample space in rate distortion optimization when determining at least one coding parameter in a coded video bit stream.

When the color value mapping is applied based only on the frequency distribution of the color component values of the source video, the transfer function used for mapping the color component values into code words becomes the cumulative distribution function (cdf) of the values in the histogram. Although the cdf matches the frequency distribution of the color component values very well, it may not always be the most suitable transfer function in perceptual sense. For instance, a picture may have a lot of noise in dark regions. This noise is often difficult to see, but the cdf curve would still use a lot of code words to cover the noise in these regions.

In one version of this embodiment, the mapping S8 of the color component values is combined with a perceptual weighting. For example, the mapping S8 may be weighted with a perceptual based transfer function such as the PQTF. In another version of this embodiment, the mapping is weighted in such way that ranges of the color space where artifacts are less noticeable to the human visual system (such as noise in dark regions) is given a lower weight, i.e. a wider bin, even though there is high frequency of color component values in these ranges.

In practice, non-linear color value mapping may to some degree compromise the linear properties of the encoder and lead to larger coding errors in some parts of the spectra. However, this may be improved by restricting the mapping of color values to code words so that the distances between the color values are not too far.

The method further comprises a step of encoding S9 the picture having the color component values of the at least one color component replaced with the code words. The picture may be encoded with HEVC or any other existing or future video encoder.

The method further comprises sending S10 information to a decoder or a post-processor on how to do an inverse mapping from the code words to the color component values for the at least one color component. In one embodiment of the present invention, Color Remapping Information (CRI) SEI or Output Code Map (OCM) SEI messages are used for signaling the color component value mapping parameters. The mapping parameters may include the bit depths of the input video and the encoded video, the interval (bin) size, the base slope, the bin (interval) ranges and/or the values to map to after decoding. Alternatively, the mentioned SEI messages may be used to signal an update (difference) with respect to previously signaled values. Other means than the CRI or OCM SEI messages could also be used to signal/update the mapping parameters, such as an additional SEI message parameters, Video Usability Information (VUI) parameters, parameters in PPS or SPS, or parameters in the slice header or on a block level.

The methods according to both of the aspects described above may further comprise at least one of the following steps prior to encoding S9 the picture:
applying S1 a transfer function on the picture;
converting S2 the picture from R'G'B' color space to Y'CbCr color space;
quantizing S3 the color component values of at least one color component with M bits, wherein M is a positive integer;
chroma subsampling S4 from a 4:4:4 color format to 4:2:0 color format.

An example of a transfer function in step S1 is the PQTF, which was already described above. However, any other transfer function may be used, such as hybrid log gamma (HLG) transfer function etc.

Converting from R'G'B' color space to Y'CbCr color space is done as follows:

$$Y'=16+(65.481 \cdot R'+128.553 \cdot G'+24.966 \cdot B')$$

$$C_B=128+(-37.797 \cdot R'-74.203 \cdot G'+112.0 \cdot B')$$

$$C_R=128+(112.0 \cdot R'-93.786 \cdot G'-18.214 \cdot B')$$

Step S3 uses M bits to quantize the color component values of at least one color component. For example, the color component values may be quantized with M=16 bits. Other values are possible however, such as M=12 etc., depending on a processing chain.

Figure 5:
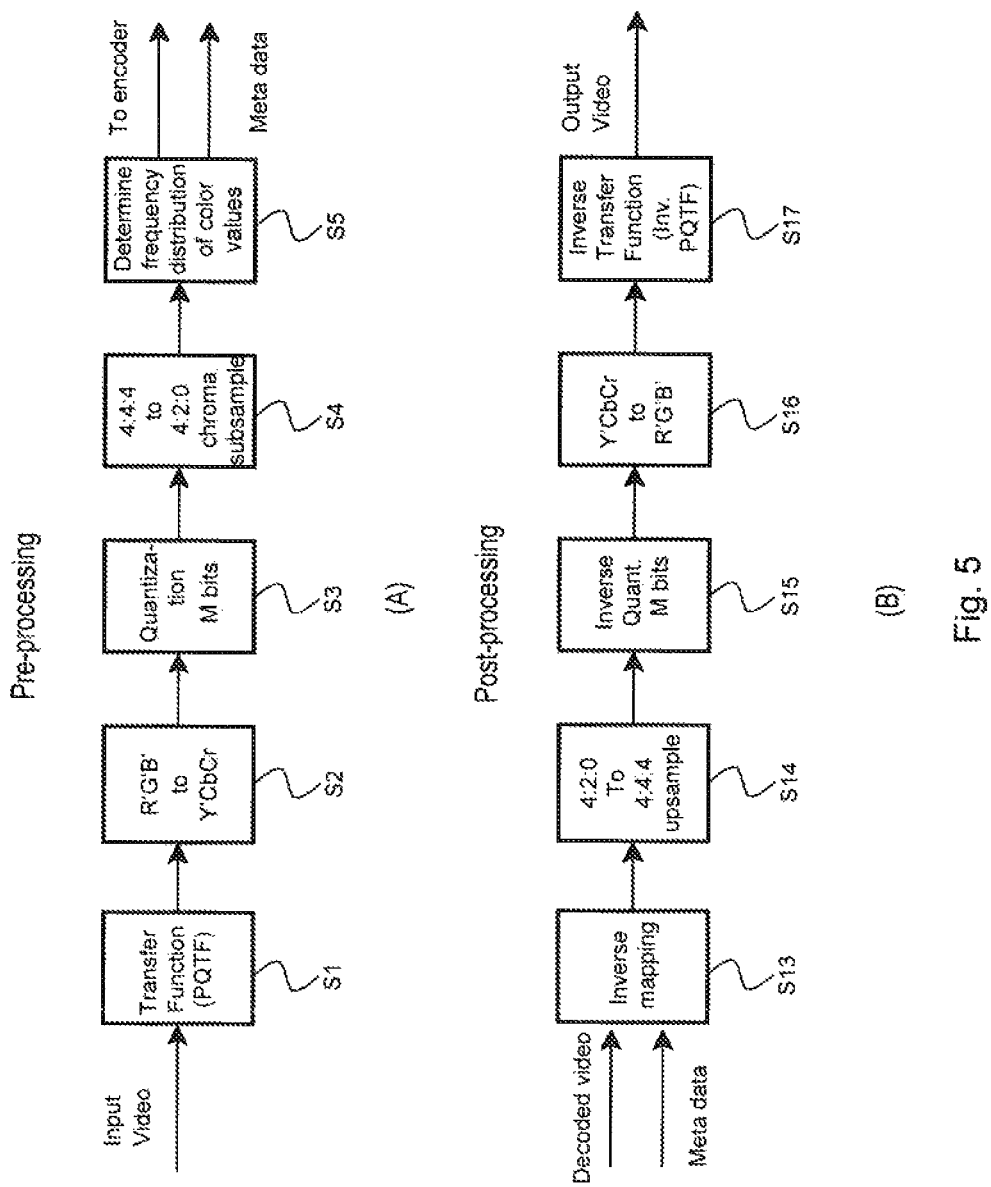
FIGS. 5-7 illustrate processing chains performed at the encoder and the decoder according to the embodiments of the present invention.

Steps S1-S4 may be performed sequentially, as depicted in FIG. 5(A), and before step S5 where a frequency distribution of the color component values is determined. However, the order in which the steps S1-S5 are performed may be different. For instance, step S5 could be placed before the chroma subsampling S4. A person skilled in the art would also understand that it would be possible to omit one or several steps. For instance, when encoding RGB data, the conversion from R'G'B' color space to Y'CbCr and the chroma subsampling blocks could be omitted. Step S1 may be omitted as well.

Figure 6:
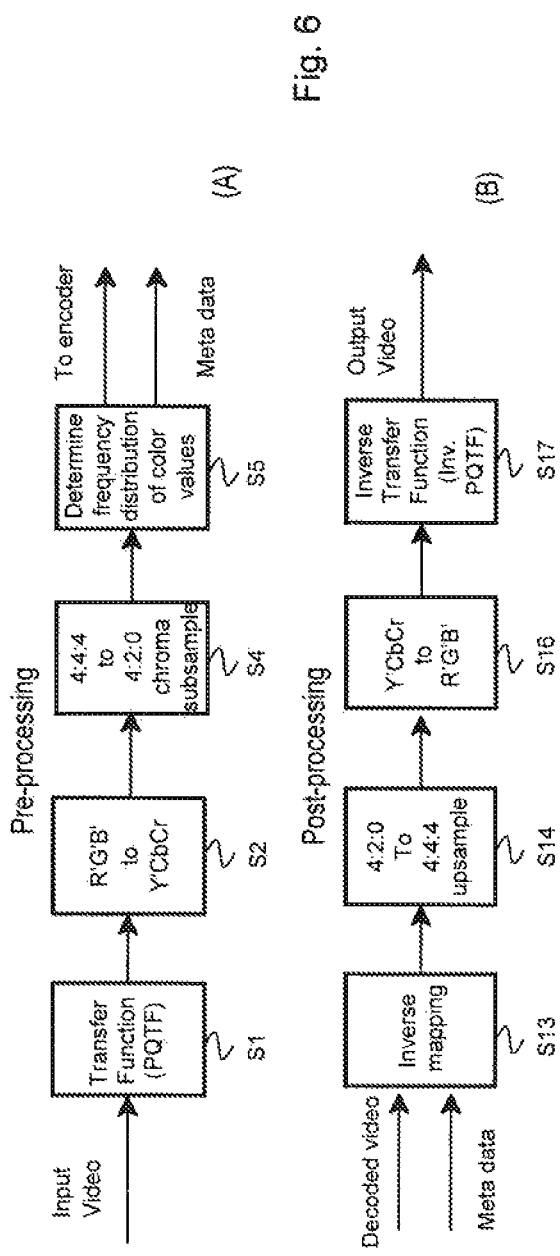

In another version of the embodiment, the quantizing S3 step is omitted and step S5 is performed directly on the float data, as depicted in FIG. 6(A). This would not require any major changes in the algorithms described previously; the only thing that would be needed to take into account would be the range of the input and output float values as they would be specified in the range [−0.5, 0.5] or [0.0, 1.0] rather than [0, 2^bitDepth], depending on the color space and the color component.

Figure 7:
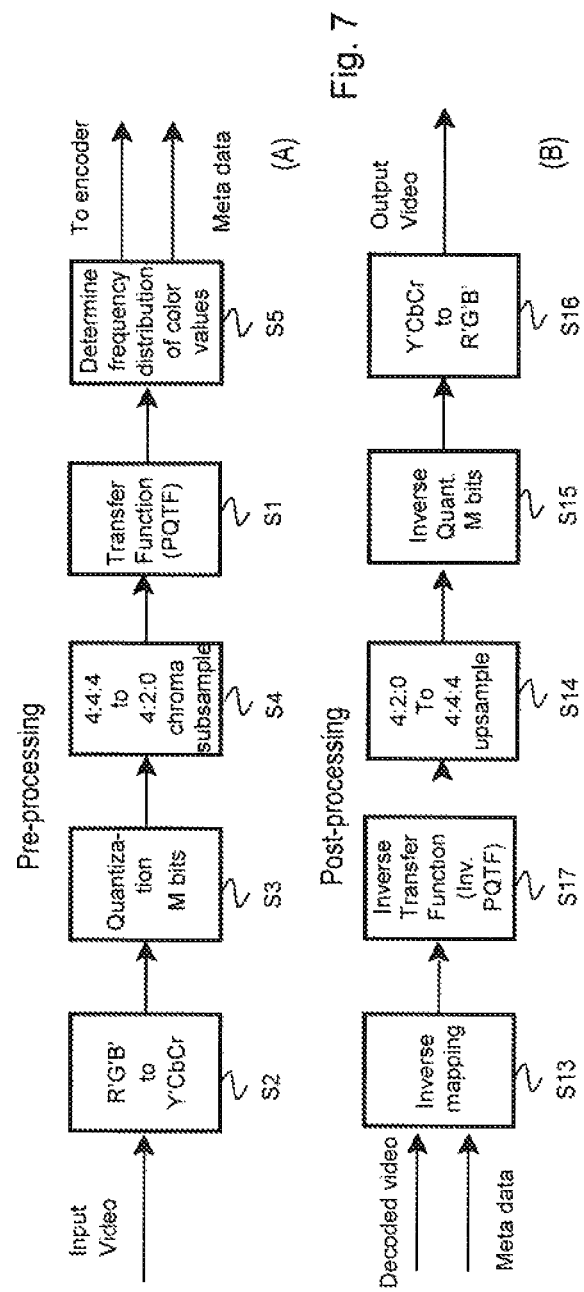

In the previously presented chains of steps, the chroma subsampling S4 is performed in a non-linear color space. This could amplify errors in the picture. FIG. 7(A) shows a chain of steps where the steps S2-S4 are performed in linear space, after which steps S1 and S5 are performed. Step S1 could then be applied separately, either before or after step S5. It would also be possible to let the curve generated by CVM to be a weighted mix between the histogram-based curve and the PQTF-curve. A benefit of this approach would be that the PQTF-curve could easily be swapped with any other curve without requiring any major changes to both the pre- and post-processing chains.

In yet another embodiment, step S1 is omitted, so the 16 bit signal containing Y'Cb'Cr' consist of linear samples (similarly this step is also omitted at the decoder). Then, for the luminance color component, an initial mapping curve is generated using CVM so that a certain transfer function is obtained, based on the human sensitivity for luminance, for example PQTF. This is the default mapping curve for the luminance color component. Then, similarly, a mapping curve is generated for each chroma component based on the human sensitivity for that chroma component. These are then the default mappings for the respective chroma components. These mappings can be used prior to video encoding and the inverse mapping after video decoding with similar or better performance than having the PQTF applied on RGB. A side benefit is that now CVM as described in other embodiments can be used to derive mappings for the specific Y'Cb'Cr' samples to be coded. Then the pre-processor can decide to use the default mapping for a color component or a specific mapping. The used mapping is signaled to the decoder/post-processing side so that the inverse mapping can take place. A default mapping need only to be signaled in the beginning of the coded video sequence and the specific mappings can be signaled as described in other embodiments. When a default mapping is used for a specific GOP, picture or block in the coded video sequence it is only needed to indicate this by a flag in PPS or slice header or in block data since the mapping is already available at the decoder/post-processor.

Figure 8:
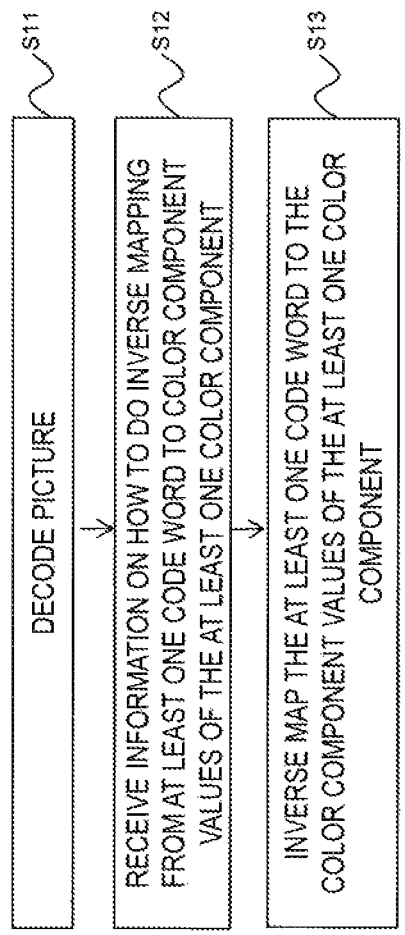
FIG. 8 illustrates a flowchart of a method of decoding a picture of a video sequence, according to an embodiment of the present invention.

According to another aspect, a method for decoding a picture of a video bitstream comprising an encoded video sequence is provided, as shown in FIG. 8. The picture comprises pixels having pixel values, wherein a pixel value is represented by at least one code word.

The method comprises a step S11 of decoding the picture. The picture may be decoded by an HEVC decoder or any other existing or future video decoder.

The method further comprises a step S12 of receiving information on how to do the inverse mapping from at least one code word to color component values of the at least one color component. For example, the information on how to do the inverse mapping may be present in Color Remapping Information (CRI) SEI or Output Code Map (OCM) SEI messages that are sent from the encoder. Alternatively, the information may be received from additional SEI message parameters, Video Usability Information (VUI) parameters, parameters in PPS or SPS, or parameters in the slice header or on a block level.

The method further comprises a step S13 of inverse mapping the at least one code word to the color component values of the at least one color component. This process is basically the inverse of the step S8, performed at the encoder, where the color values of the at least one color component are mapped to code words. An example of a pseudocode for the inverse mapping step is given below:

```
FOR each component
    FOR i in range (0, number of values)
        x = input[component][i]
        // Find the interval (on the y-axis) containing the value
        int = intervals[component].findY(pixel[component])
        // Linear interpolation
        y = int.x1 + (int.x2 – int.x1) * (x – int.y1) / (int.y2 – int.y1)
        output[component][i] = y
END FOR
```

The method may further optionally comprise at least one of the following steps, performed after the inverse mapping step S13:

chroma upsampling (S14) from a 4:2:0 color format to a 4:4:4 color format;

inverse quantizing (S15) the color component values of at least one color component with M bits, wherein M is a positive integer converting (S16) the picture from Y'CbCr color space to R'G'B' color space;

applying (S17) an inverse transfer function on the picture.

These steps are the inverse steps of the steps S1-S4, performed at the encoder. Similarly, these steps may be performed sequentially, and after the inverse mapping step S13. The order in which these steps are performed may also be different from the one above. A person skilled in the art would also understand that it would be possible to omit one or several steps. However, the order in which the steps are performed is reversed compared to the order in which the corresponding steps are performed at the encoder side. This is illustrated in FIGS. 5(B), 6(B) and 7(B) respectively.

Figure 9:
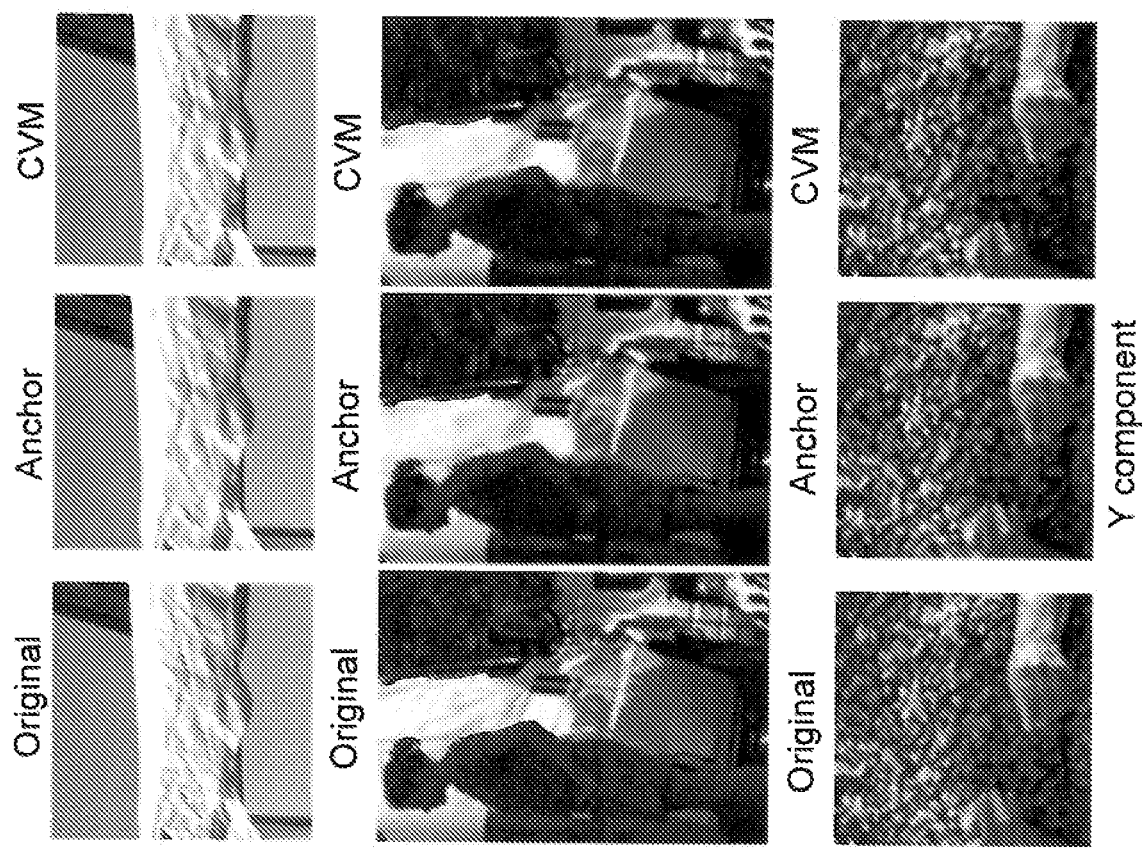
FIGS. 9 (A)-(C) illustrate examples of subjective improvements as compared to the anchors set up by MPEG, for the Y, Cb and Cr components respectively, according to an embodiment of the present invention
Figure 9:
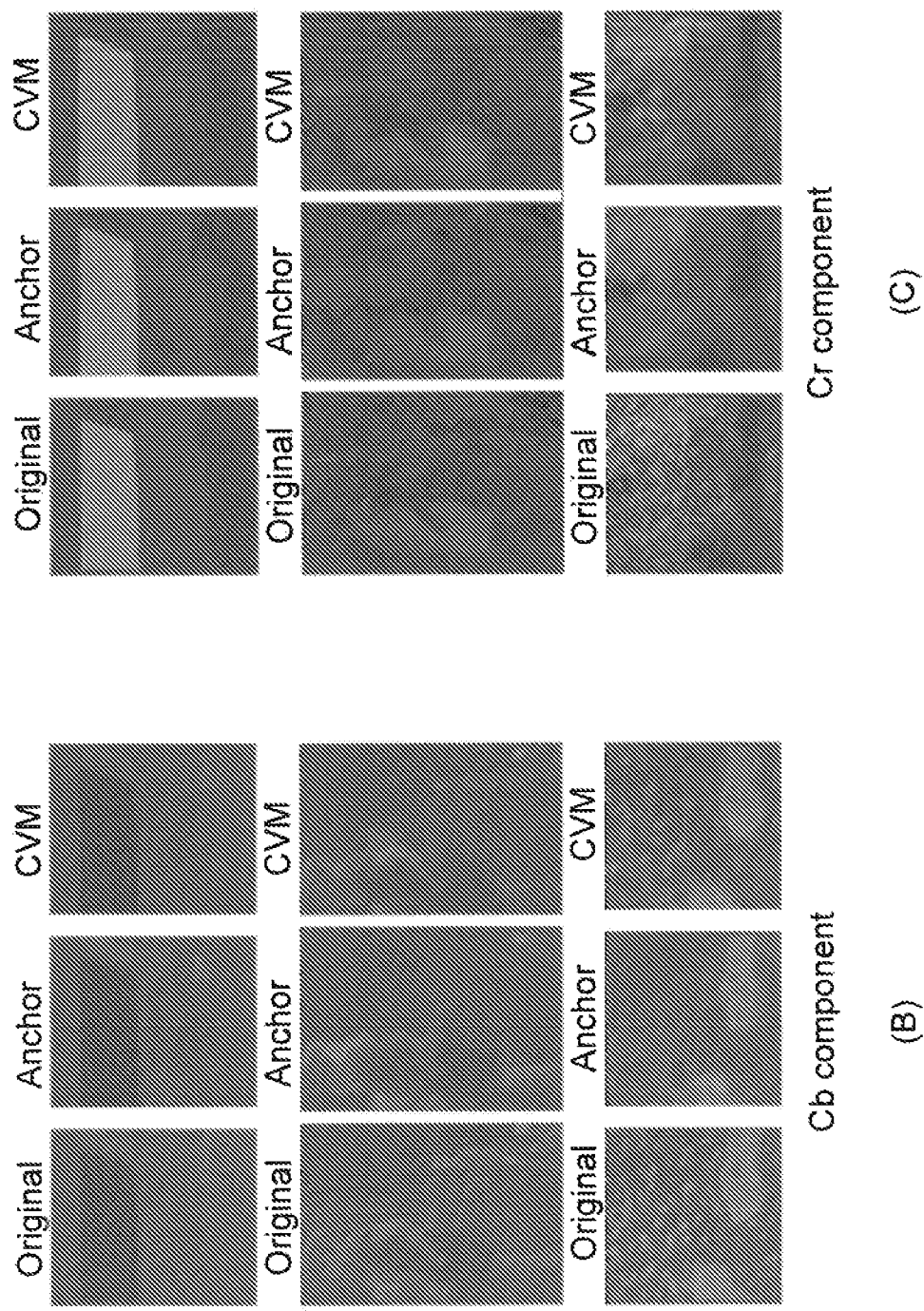

Some subjective improvements of the invention are shown in FIGS. 9 (A)-(C) for the Y, Cb and Cr component respectively, at comparable bitrates. As can be seen the anchor sequences (from the MPEG Call for Evidence (CfE) on HDR and Wide Color Gamut (WCG) video coding) contain discoloring or loss of colors compared to the original. The solution according to the present invention (marked as CVM in the figure) does not have these problems.

Objective gains are shown in Table 4. Negative BDR numbers for the metrics mean that the solution according to the present invention is better than the anchor. DeltaE was the metric that correlated the best with subjective results in the MPEG CfE on HDR and wide color gamut (WCG) video coding.

TABLE 4

Objective BDR gains of the invention compared to the anchor settings of the MPEG CfE on HDR and WCG video coding.

| | | $tPSNR_X$ | $tPSNR_Y$ | $tPSNR_Z$ | $tPSNR_{XYZ}$ | deltaE | mPSNR |
|---|---|---|---|---|---|---|---|
| class A | FireEaterClip4000r1 | −7.2% | −0.2% | −17.7% | −8.6% | −15.3% | −42.0% |
| | Market3Clip4000r2 | −2.0% | 0.4% | −9.7% | −4.6% | −42.2% | −5.5% |
| | Tibul2Clip4000r1 | −3.6% | 0.8% | −15.3% | −4.4% | −11.6% | −8.4% |
| class B | AutoWelding | 4.1% | 12.5% | −10.9% | −0.3% | −30.1% | −25.8% |
| | BikeSparklers | 2.4% | 7.0% | −10.6% | −1.5% | −35.0% | −9.1% |
| class C | ShowGirl2Teaser | −1.3% | 3.8% | −15.2% | −5.1% | −34.6% | −12.4% |
| class D | StEM_MagicHour | 0.4% | 4.8% | −10.5% | −4.6% | −29.3% | −11.5% |
| | StEM_WarmNight | −3.6% | 3.4% | −10.6% | −5.2% | −31.3% | −19.1% |
| class G | BalloonFestival | −2.9% | 0.9% | −5.6% | −3.4% | −24.0% | −4.8% |
| | Overall | −1.6% | 3.7% | −11.8% | −4.2% | −28.1% | −15.4% |

Figure 10:
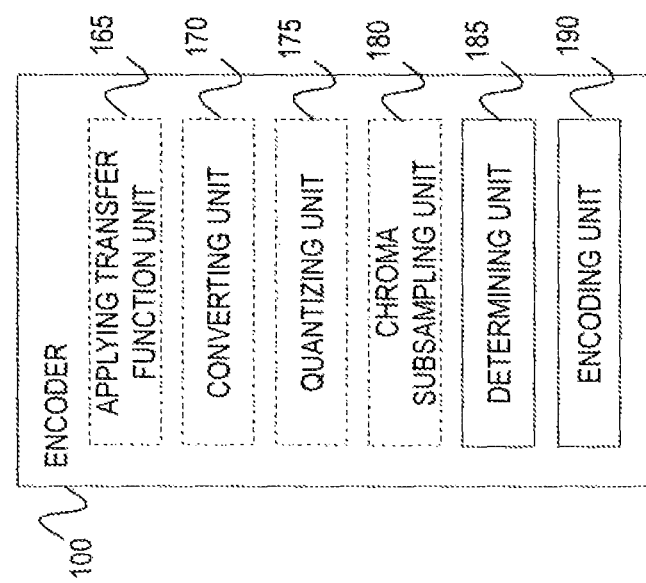

FIG. 10 is a schematic block diagram of an encoder 100 for encoding a picture of a video sequence in a video bitstream. The picture comprises pixels wherein each pixel has a color value comprising at least one color component value. The encoder comprises a determining unit 185, configured to determine a frequency distribution of the color component values of the at least one color component. The determining unit is further configured to determine at least one quantization parameter for coding of transform coefficients for the at least one color component based on the determined frequency distribution of the color component values. The encoder comprises an encoding unit 190, configured to encode the determined at least one quantization parameter.

The encoder may optionally comprise an applying transfer function unit 165, configured to apply a transfer function on the picture. The encoder may further optionally comprise a converting unit 170, configured to convert the picture from RGB color space to Y'CbCr color space. The encoder may further optionally comprise a quantizing unit 175, configured to quantize color component values of at least one color component with M bits, wherein M is a positive integer. The encoder may further optionally comprise a chroma subsampling unit 180, configured to chroma subsample from 4:4:4 to 4:2:0 color format.

The determining 185, encoding 190, applying a transfer function 165, converting 170, quantizing 175 and chroma subsampling 180 units may be hardware based, software based (in this case they are called determining, encoding, applying transfer function, converting, quantizing and chroma subsampling modules respectively) or may be a combination of hardware and software.

The encoder 100 may be an HEVC encoder or any other state of the art or future video encoder. The determining unit 185 may determine a frequency distribution of the color component values of at least one color component. A color component value could refer to a sample value in one of the color components of the color format, e.g. Y'CbCr or RGB, or a value representing another property of the pixels, e.g. a depth value, a transparency value or the like. Further on, a frequency distribution of the color component values of only one or two of the Y', Cb or Cr component may be determined, or a frequency distribution of the color component values for all of the Y', Cb and Cr components may be determined.

The determining unit 185 may further determine at least one quantization parameter (QP) for coding of transform coefficients for the at least one color component based on the determined frequency distribution of the color component values. This way, the quantization (or equivalently quantization parameter) of transform coefficients for a color component, is controlled by the frequency distribution of color component values for that color component.

The encoding unit 190 may encode the determined at least one quantization parameter.

The encoder 100 can be implemented in hardware, in software or a combination of hardware and software. The encoder 100 can be implemented in user equipment, such as a mobile telephone, tablet, desktop, netbook, multimedia player, video streaming server, set-top box or computer. The encoder 100 may also be implemented in a network device in the form of or connected to a network node, such as radio base station, in a communication network or system.

Although the respective units disclosed in conjunction with FIG. 10 have been disclosed as physically separate units in the device, where all may be special purpose circuits, such as ASICs (Application Specific Integrated Circuits). Alternative embodiments of the device are possible where some or all of the units are implemented as computer program modules running on a general purpose processor. Such an embodiment is disclosed in FIG. 11.

Figure 11:
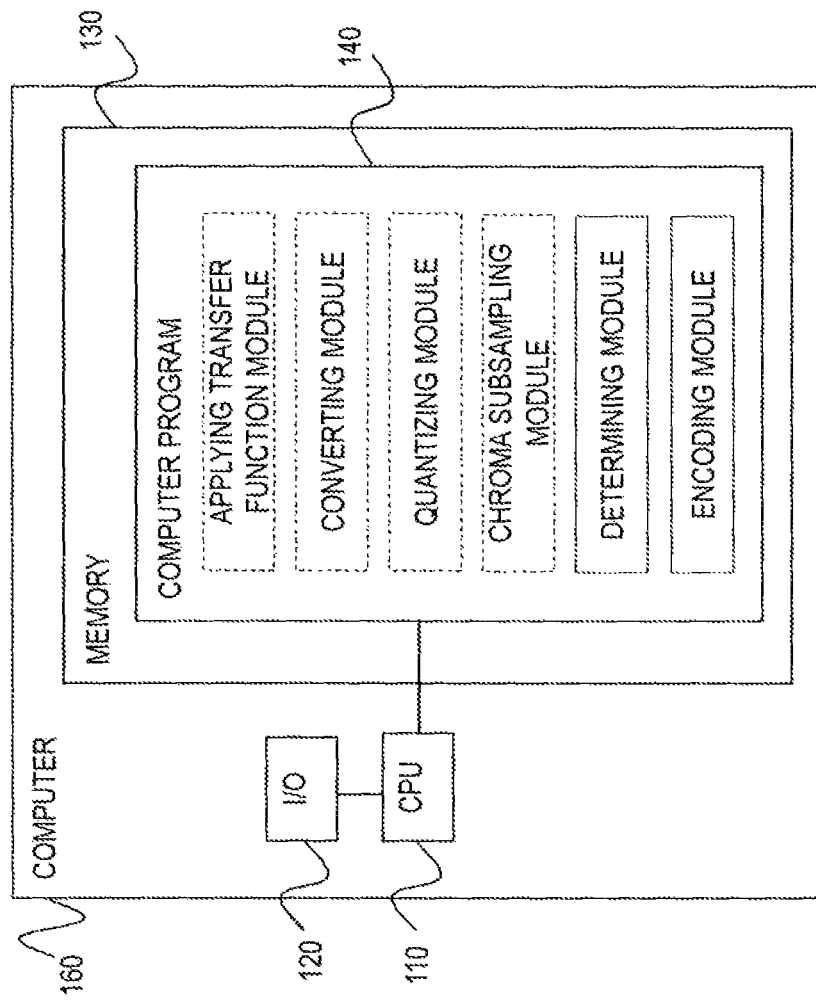

FIG. 11 schematically illustrates an embodiment of a computer 160 having a processing unit 110 such as a DSP (Digital Signal Processor) or CPU (Central Processing Unit). The processing unit 110 can be a single unit or a plurality of units for performing different steps of the method described herein. The computer also comprises an input/output (I/O) unit 120 for receiving a video sequence. The I/O unit 120 has been illustrated as a single unit in FIG. 11 but can likewise be in the form of a separate input unit and a separate output unit.

Furthermore, the computer 160 comprises at least one computer program product 130 in the form of a non-volatile memory, for instance an EEPROM (Electrically Erasable Programmable Read-Only Memory), a flash memory or a disk drive. The computer program product 130 comprises a computer program 140, which comprises code means which, when run on the computer 160, such as by the processing unit 110, causes the computer 160 to perform the steps of the method described in the foregoing in connection with FIG. 2.

FIG. 12 is a schematic block diagram of an encoder 200 for encoding a picture of a video sequence in a video bitstream. The picture comprises pixels wherein each pixel has a color value comprising at least one color component value. The encoder comprises a determining unit 270, configured to determine a frequency distribution of the color component values of the at least one color component. The encoder comprises a mapping unit 275, configured to map the color component values of the at least one color component to code words, based on the determined frequency distribution of the color component values of the at least one color component. The encoder further comprises an encoding unit 280, configured to encode the picture having the color component values of the at least one color component replaced with the code words. The encoder further comprises a sending unit 285, configured to send information to a decoder or a post-processor on how to do an inverse mapping from the code words to the color component values for the at least one color component.

The encoder may optionally comprise an applying transfer function unit 165, configured to apply a transfer function on the picture. The encoder may further optionally comprise a converting unit 170, configured to convert the picture from RGB color space to Y'CbCr color space. The encoder may further optionally comprise a quantizing unit 175, configured to quantize color component values of at least one color component with M bits, wherein M is a positive integer. The encoder may further optionally comprise a chroma subsampling unit 180, configured to chroma subsample from 4:4:4 to 4:2:0 color format.

The determining 270, mapping 275, encoding 280, sending 285, applying transfer function 165, converting 170, quantizing 175 and chroma subsampling 180 units may be hardware based, software based (in this case they are called determining, mapping, encoding, sending, applying a transfer function, converting, quantizing and chroma subsampling modules respectively) or may be a combination of hardware and software.

The encoder 200 may be an HEVC encoder or any other state of the art or future video encoder.

The determining unit 270 may determine a frequency distribution of the color component values of at least one color component. A color component value could refer to a sample value in one of the color components of the color format, e.g. Y'CbCr or RGB, or a value representing another property of the pixels, e.g. a depth value, a transparency value or the like. Further on, a frequency distribution of the color component values of only one or two of the Y', Cb or Cr component may be determined, or a frequency distribution of the color component values for all of the Y', Cb and Cr components may be determined.

The mapping unit 275 may map the color component values of the at least one color component to code words, based on the determined measure of frequency distribution of the color component values of the at least one color component. Each of the color components may have its own mapping curve. For example, a different mapping curve may be generated for each one of the Y', Cb, and Cr color components based on the frequency distribution of the corresponding color component values.

The encoding unit 280 may encode the picture having the color component values of the at least one color component replaced with the code words.

The sending unit 285 may send information to a decoder or a post-processor on how to do an inverse mapping from the code words to the color component values for the at least one color component. The sending unit may use Color Remapping Information (CRI) SEI or Output Code Map (OCM) SEI messages for signaling the color component value mapping parameters. Other means than the CRI or OCM SEI messages could also be used to signal/update the mapping parameters, such as an additional SEI message parameters, Video Usability Information (VUI) parameters, parameters in PPS or SPS, or parameters in the slice header or on a block level.

The encoder 200 can be implemented in hardware, in software or a combination of hardware and software. The encoder 200 can be implemented in user equipment, such as a mobile telephone, tablet, desktop, netbook, multimedia player, video streaming server, set-top box or computer. The encoder 200 may also be implemented in a network device in the form of or connected to a network node, such as radio base station, in a communication network or system.

Although the respective units disclosed in conjunction with FIG. 12 have been disclosed as physically separate units in the device, where all may be special purpose circuits, such as ASICs (Application Specific Integrated Circuits). Alternative embodiments of the device are possible where some or all of the units are implemented as computer program modules running on a general purpose processor. Such an embodiment is disclosed in FIG. 13.

FIG. 13 schematically illustrates an embodiment of a computer 260 having a processing unit 210 such as a DSP (Digital Signal Processor) or CPU (Central Processing Unit). The processing unit 210 can be a single unit or a plurality of units for performing different steps of the method described herein. The computer also comprises an input/output (I/O) unit 220 for receiving a video sequence. The I/O unit 220 has been illustrated as a single unit in FIG. 14 but can likewise be in the form of a separate input unit and a separate output unit.

Furthermore, the computer 260 comprises at least one computer program product 230 in the form of a non-volatile memory, for instance an EEPROM (Electrically Erasable Programmable Read-Only Memory), a flash memory or a disk drive. The computer program product 230 comprises a computer program 240, which comprises code means which, when run on the computer 260, such as by the processing unit 210, causes the computer 260 to perform the steps of the method described in the foregoing in connection with FIG. 3.

According to a further aspect a decoder 300 for decoding a picture of a video bitstream comprising an encoded video sequence is provided, as shown in FIG. 14. The picture comprises pixels having pixel values, wherein a pixel value is represented by at least one code word. The decoder comprises a decoding unit 370, configured to decode the picture. The decoder comprises a receiving unit 380, configured to receive information on how to do the inverse mapping from at least one code word to color component values of the at least one color component. The decoder comprises an inverse mapping unit 390, configured to inverse map the at least one code word to the color component values of the at least one color component.

The decoding 370, receiving 380 and inverse mapping 390 units may be hardware based, software based (in this case they are called decoding, receiving and inverse mapping modules respectively) or may be a combination of hardware and software.

Decoder 300 may be an HEVC encoder or any other state of the art or future video decoder.

The decoding unit 370 may decode the picture, for example with HEVC.

The receiving unit 380 may receive information on how to do the inverse mapping from at least one code word to color component values of the at least one color component. For example, the information on how to do the inverse mapping may be present in Color Remapping Information (CRI) SEI or Output Code Map (OCM) SEI messages that are sent from the encoder. Alternatively, the information may be received from additional SEI message parameters, Video Usability Information (VUI) parameters, parameters in PPS or SPS, or parameters in the slice header or on a block level.

The inverse mapping unit 390 may inverse map the at least one code word to the color component values of the at least one color component.

The decoder 300 can be implemented in hardware, in software or a combination of hardware and software. The decoder 300 can be implemented in user equipment, such as a mobile telephone, tablet, desktop, netbook, multimedia player, video streaming server, set-top box or computer. The decoder 300 may also be implemented in a network device in the form of or connected to a network node, such as radio base station, in a communication network or system.

Although the respective units disclosed in conjunction with FIG. 14 have been disclosed as physically separate units in the device, where all may be special purpose circuits, such as ASICs (Application Specific Integrated Circuits). Alternative embodiments of the device are possible where some or all of the units are implemented as computer program modules running on a general purpose processor. Such an embodiment is disclosed in FIG. 15.

FIG. 15 schematically illustrates an embodiment of a computer 360 having a processing unit 310 such as a DSP (Digital Signal Processor) or CPU (Central Processing Unit). The processing unit 310 can be a single unit or a plurality of units for performing different steps of the method described herein. The computer also comprises an input/output (I/O) unit 320 for receiving a video bitstream. The I/O unit 320 has been illustrated as a single unit in FIG. 14 but can likewise be in the form of a separate input unit and a separate output unit.

Furthermore, the computer 360 comprises at least one computer program product 330 in the form of a non-volatile memory, for instance an EEPROM (Electrically Erasable Programmable Read-Only Memory), a flash memory or a disk drive. The computer program product 330 comprises a computer program 340, which comprises code means which, when run on the computer 360, such as by the processing unit 310, causes the computer 360 to perform the steps of the method described in the foregoing in connection with FIG. 8.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

LIST OF ABBREVIATIONS

| Abbreviation | Explanation |
|---|---|
| BDR | Bjontegaard Delta Rate |
| CfE | Call for Evidence |
| CVM | Color Value Mapping |
| CRI SEI | Color Remapping SEI |
| GOP | Group Of Pictures |
| HDR | High Dynamic Range |
| HDTV | High Definition TV |
| HVS | Human Visual System |
| MPEG | Motion Picture Experts Group |
| OCM SEI | Output Code Map SEI |
| PQTF | Perceptual Quantizer Transfer Function |
| RGB | Red Green Blue (color components) |
| SDR | Standard Dynamic Range |
| SEI | Supplemental Enhancement Information |
| TF | Transfer Function |
| UHDTV | Ultra High Definition TV |
| WCG | Wide Color Gamut |

The invention claimed is:

1. A method for encoding a picture in a video bitstream, the picture comprising a set of pixels associated with a set of input color component values, the method comprising:
   determining a frequency distribution of input color component values included in the set of input color component values;
   mapping each one of the input color component values to a code word, based on the determined frequency distribution of the input color component values;
   encoding the picture by replacing each one of the input color component values with the code word to which the input color component value is mapped; and
   sending to a decoder or a post-processor information indicating how to perform an inverse mapping from the code words to output color component values.

2. The method of claim 1, further comprising performing at least one of the following steps prior to encoding the picture:
   applying a transfer function on the picture;
   converting the picture from R'G'B' color space to Y'CbCr color space;
   quantizing the input color component values with M bits, wherein M is a positive integer; or
   chroma subsampling from a 4:4:4 color format to 4:2:0 color format.

3. The method of claim 1, wherein the mapping each of the input color component values to one of the code words includes using bins of fixed size, wherein the size of bins depends on a ratio between a bit depth of the picture and a bit depth used for encoding.

4. The method of claim 1, wherein the mapping each of the input color component values to one of the code words includes using bins of variable size, wherein the bin size depends on the frequency distribution of the input color component values.

5. The method of claim 1, wherein
   each of N most frequent input color component values within the set of input color component values has the same value as one of the output color component values, and
   N is greater than or equal to 1.

6. The method of claim 1, where the mapping of each of the input color component values to one of the code words is further based on perceptual weighting.

7. A method for decoding a picture of a video bitstream comprising an encoded video sequence, wherein the picture comprises a set of pixels associated with a set of code words, the method comprising:
   a decoder decoding the picture;
   the decoder receiving information indicating how to map each code word included in the set of code words to an output color component value, wherein the information was derived based on a frequency distribution of input color component values within a set of input color component values corresponding to the picture; and
   based on the obtained information, the decoder mapping each code word included in the set of code words to an output color component value.

8. The method of claim 7, further comprising performing at least one of the following steps after the inverse mapping:
   chroma upsampling from a 4:2:0 color format to a 4:2:4 color format;
   inverse quantizing the output color component values with M bits, wherein M is a positive integer;
   converting the picture from Y'CbCr color space to R'G'B' color space; or
   applying an inverse transfer function on the picture.

9. A decoder, for decoding a picture of a video bitstream comprising an encoded video sequence, wherein the picture comprises a set of pixels associated with a set of code words, the decoder comprising:
   a processor; and
   a memory coupled to the processor, the memory containing instructions executable by the processor, wherein the processor is configured to:
   decode the picture;
   obtain information indicating how to map each code word included in the set of code words to an output color component value, wherein the information was derived based on a frequency distribution of input color component values within a set of input color component values corresponding to the picture; and
   based on the obtained information, map each code word included in the set of code words to an output color component value.

10. The decoder of claim 9, wherein the processor is further configured to perform at least one of:
    chroma upsample from a 4:2:0 color format to a 4:2:4 color format;
    inverse quantize the output color component values with M bits, wherein M is a positive integer;
    convert the picture from Y'CbCr color space to R'G'B' color space; or
    apply an inverse transfer function on the picture.

11. A computer program product comprising a non-transitory computer readable medium storing a computer program for decoding a picture of a video bitstream comprising an encoded video sequence, wherein the picture comprises a set of pixels associated with a set of code words, the computer program comprising code, which when run on a processor, causes the processor to:
    decode the picture;
    obtain information indicating how to map each code word included in the set of code words to an output color component value, wherein the information was derived based on a frequency distribution of input color component values within a set of input color component values corresponding to the picture; and
    based on the obtained information, map each code word included in the set of code words to an output color component value.

12. The computer program product of claim 11, wherein the computer program comprising code, which when run on the processor, further causes the processor to:
- chroma upsample from a 4:2:0 color format to a 4:2:4 color format;
- inverse quantize the output color component values with M bits, wherein M is a positive integer;
- convert the picture from Y'CbCr color space to R'G'B' color space; or
- apply an inverse transfer function on the picture.

13. The method of claim 1, wherein the set of color component values is associated with a particular color.

14. The method of claim 1, wherein the frequency distribution of the color component values indicates the number of pixels associated with each of the color component values within the picture.

15. The method of claim 1, wherein the information includes at least one of a bit depth of the video bitstream, a bit depth of an encoded video including the encoded picture, an interval size of a bin, a base slope, or a range of a bin.

16. The method of claim 7, wherein the set of color component values is associated with a particular color.

17. The method of claim 7, wherein the frequency distribution of the color component values indicates the number of pixels associated with each of the color component values within the picture before encoding.

18. The method of claim 7, wherein the information includes at least one of a bit depth of an input video bitstream, a bit depth of the video bitstream, an interval size of a bin, a base slope, or a range of a bin.

* * * * *